United States Patent [19]

Alt et al.

[11] 4,317,497

[45] Mar. 2, 1982

[54] BATTERY TRAY FOR ELECTRIC VEHICLE

[75] Inventors: Robert D. Alt; James H. Richardson, both of Warren; Alverson B. Williams, Sterling Heights, all of Mich.

[73] Assignee: General Motors Corporation, Detroit, Mich.

[21] Appl. No.: 172,768

[22] Filed: Jul. 28, 1980

[51] Int. Cl.³ ............................................. B62D 25/00
[52] U.S. Cl. ................................... 180/68.5; 248/503; 429/99
[58] Field of Search ................. 180/68.5; 410/32, 141; 105/50, 51; 248/503; 429/99, 148, 158, 159; 362/183, 190, 194

[56] References Cited

U.S. PATENT DOCUMENTS

| | | | |
|---|---|---|---|
| 1,607,908 | 11/1926 | Nelson | 180/68.5 X |
| 2,833,363 | 5/1958 | Henehan | 180/68.5 |
| 2,849,074 | 8/1958 | Key et al. | 180/68.5 |
| 3,704,761 | 12/1972 | Barrett, Jr. | 248/503 X |
| 4,013,300 | 3/1977 | Berger | 180/68.5 X |
| 4,020,244 | 4/1977 | Selinko | 429/99 X |

*Primary Examiner*—Joseph F. Peters, Jr.
*Assistant Examiner*—D. W. Underwood
*Attorney, Agent, or Firm*—Lawrence B. Plant

[57] ABSTRACT

A support for securing a battery pack in a vehicle wherein the battery pack includes a plurality of batteries bound together between two end plates having threaded mounting studs affixed thereto and projecting outwardly therefrom. The support includes a horizontal tray having an upstanding peripheral rim, a retainer flange projecting outwardly from the rim along one side of the tray, an upstanding mounting plate on the side of the tray opposite the retainer flange, and a retainer bar positioned above the retainer flange and appropriately secured thereto. The upstanding plate and retainer bar have apertures for receiving the studs on the battery pack.

4 Claims, 4 Drawing Figures

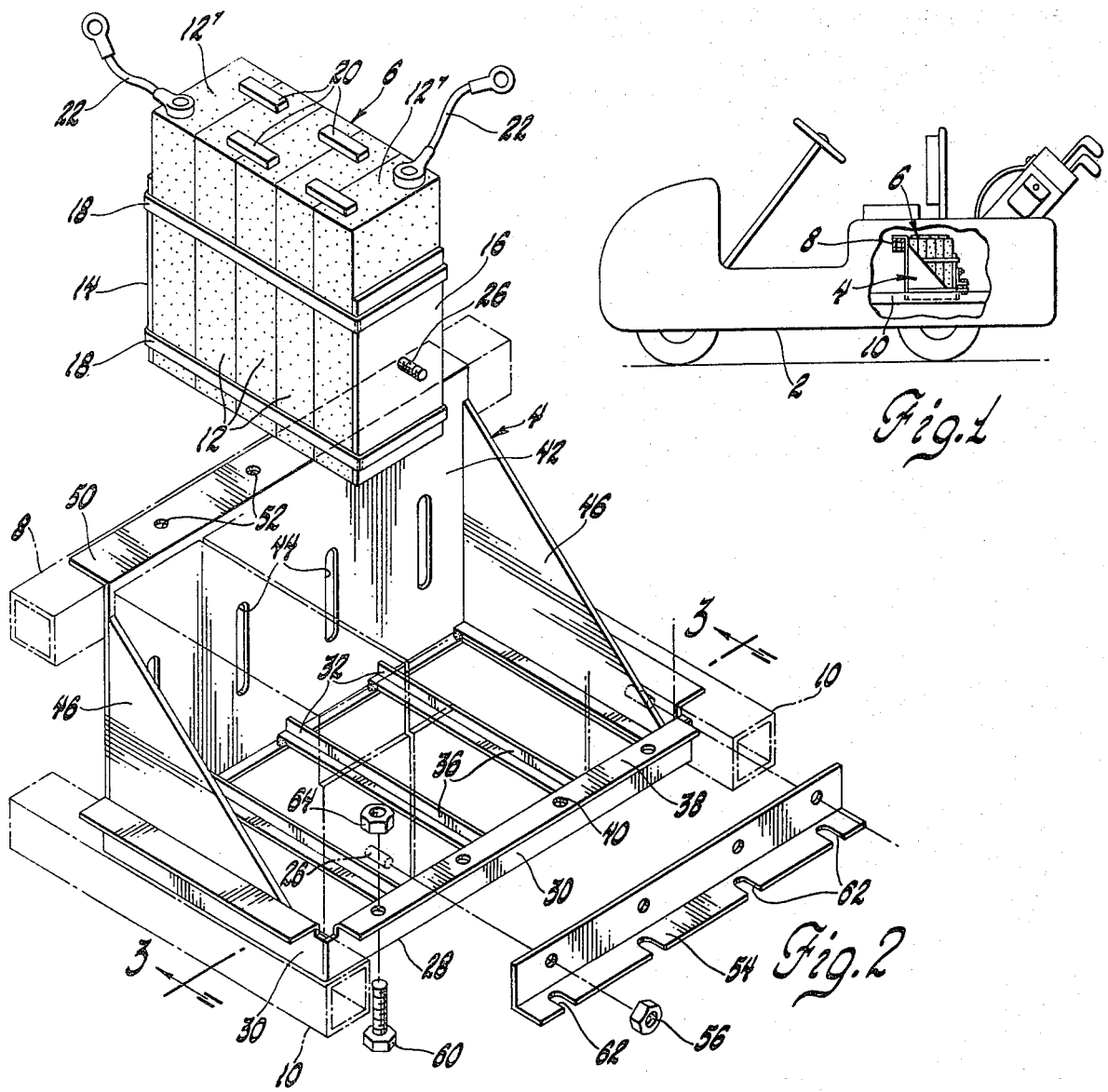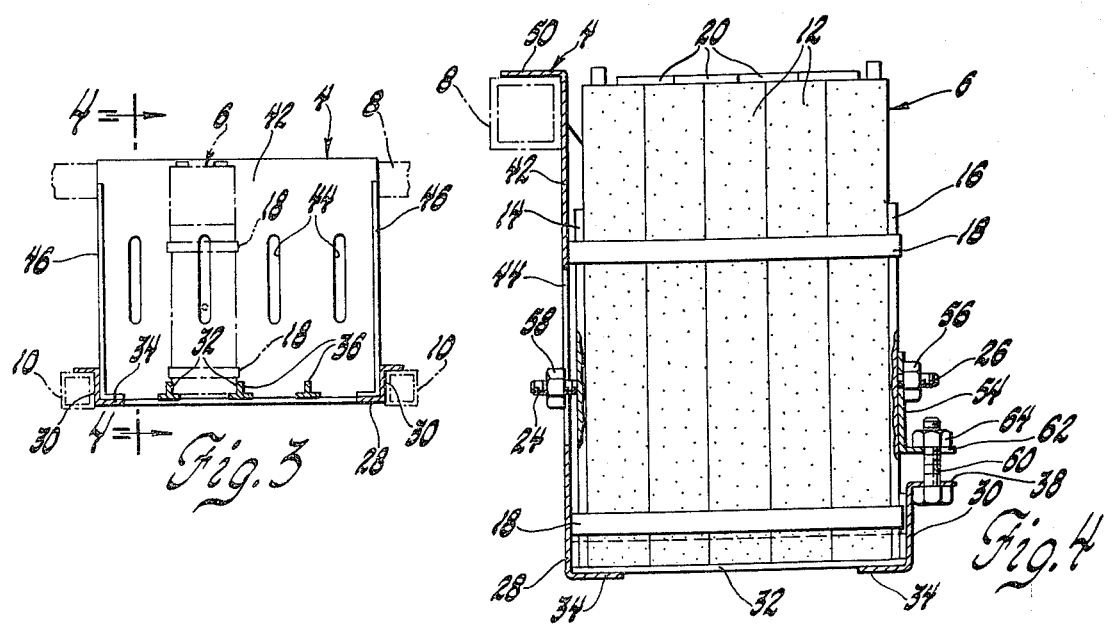

BATTERY TRAY FOR ELECTRIC VEHICLE

BACKGROUND OF THE INVENTION

This invention relates to a support for securing a plurality of batteries in a vehicle and more particularly for securing motive power batteries in electrically powered vehicles such as golf carts, fork lifts, industrial trucks, automobiles, etc.

Battery powered vehicles require appropriate means for anchoring the drive batteries to the vehicle lest in jostling they become damaged during the ordinary and normal use of the vehicle. At the same time, it is necessary to do so in a manner which permits easy access and ready removal for maintenance and/or replacement. Such vehicles normally require a plurality of discrete batteries electrically connected in series to provide the requisite high voltages that the drive systems require. For example, when alkaline (e.g., nickel-zinc) batteries are used they are normally packaged as single cell (i.e., 1.7 V) batteries and then bound together in a stack to form a battery pack having the requisite voltage.

It is an object of the present invention to provide a simple but effective support for anchoring a plurality of discrete batteries in an electric vehicle in a manner which permits ready removal thereof for servicing or replacement. This object and other objects and advantages of the present invention will become more readily apparent from the detailed description thereof which follows.

DETAILED DESCRIPTION OF A SPECIFIC EMBODIMENT OF THE INVENTION

FIG. 1 illustrates a battery powered vehicle (e.g., golf cart);

FIG. 2 is an exploded perspective view of a battery support in accordance with the present invention;

FIG. 3 is a sectional front elevational view in the direction 3—3 of FIG. 2; and FIG. 4 is a sectioned side elevational view in the direction 4—4 of FIG. 3.

FIG. 1 illustrates a battery powered vehicle (i.e., a golf cart) 2 having a support 4 for a battery pack 6 affixed to the cross members 8 and 10 of the vehicle's frame (shown in phantom on FIG. 2). The battery pack 6 comprises a plurality of discrete batteries 12 bound together between end plates 14 and 16 by means of steel straps 18. The end plates 14 and 16 have studs 24 and 26 affixed (e.g., welded) thereto for securing the packs 6 in the support. The several batteries 12 are electrically connected in series by means of intercell connectors 20. The end batteries 12' in each pack 6 have appropriate cables 22 connected thereto for joining the cell pack to adjacent cell packs, as may be required, and to the vehicle's electric drive system.

The battery support 4 is best shown in FIGS. 2-4 and comprises a tray 28 which engages the underside of the several battery packs 6. While the tray 28 may have a solid bottom, it is preferably open to permit air circulation through the battery packs for cooling thereof. In this regard, the single cells of a Ni-Zn battery pack would normally be slightly spaced one from the other (not shown) to allow for cooling air to pass between the cells. As best shown in FIG. 2, the tray 28 has an upstanding peripheral rim 30 and is formed by welding a plurality of T-shaped (i.e., in cross section) iron members 32 to horizontal shelves 34 which extend inwardly from the rim 30. The T-irons 32 are spaced one from the other so as to snugly accommodate the several cell packs 6 therebetween. In this regard, the upstanding portion 36 of the T-irons 32 serve to space the packs 6 slightly one from the other at the bottoms thereof. The peripheral rim 30 along the front of the tray 28 includes a horizontally extending retainer flange 38 which in turn includes a plurality of apertures 40 spaced apart along the flange. An upstanding mounting plate 42 at the back of the tray 28 (i.e., opposite the retainer flange 38) provides a back support for the tray 28 as well as a rigid anchoring site for one end of the battery pack 6. In this latter regard, the mounting plate 42 includes a plurality of slots 44 which receive studs 24 for securing the end plate 14 to the plate 42 by means of nut 58 (see FIG. 4). The mounting plate 42 is held perpendicular to the tray 28 and the tray itself supported at its ends by gussets 46 which are rigidly affixed (e.g., welding) to the mounting plate 42 and the lateral rims 30 of the tray 28. Lateral flanges 48 project outboard the gussets 46 and may additionally serve to support the tray 28 on appropriate vehicle frame members 10 when so provided. Outwardly projecting flange 50 atop the mounting plate 42 has a plurality of apertures 52 therein for bolting the support 4 to a vehicle frame member 8.

To secure the battery pack 6 in the support 4, the stud 24 is inserted substantially horizontally into the slot 44 and the pack gently lowered vertically into the tray 28 between the appropriate upstanding portions 36 of the T-bars 32. By sliding the pack 6 horizontally into the support and then lowering it vertically into the tray 28, a tighter fit may be obtained in the tray 28 than if the cell packs 6 had to be canted into position. After all the packs 6 are in position in the tray 28, a retainer bar 54 is placed over the several studs 26 on the opposite ends of the cell packs 6 and secured thereto by appropriate nuts 56. The studs 24 are then secured to the plate 42 by nuts 58. Thereafter a bolt 60 is passed through the apertures 40 in the retainer flange and the cutouts 62 in the retainer bar 54. Nuts 64 engage the bolts 60 and pull the retainer bar 54 tightly down toward the retaining flange 38. Thereafter, the nut 58 anchors the other side of the cell packs 6 to the mounting plate 42. In addition to permitting horizontal insertion of the battery pack 6, the slots 44 permit a single support 4 to accommodate cell packs 6 of varying height or cell packs where the end plates 14 and 16 are not perfectly aligned with the bottom of the cell pack 6. Similarly, the retainer bar 54 may be adjusted to accommodate those same differences at the other end of the cell pack.

While this invention has been disclosed primarily in terms of a single embodiment thereof, it is not intended to be limited thereto but rather only to the extent set forth in the claims which follow.

The embodiments of the invention in which an exclusive property or privilege is claimed are defined as follows:

1. A support for securing a battery pack in a vehicle, said pack comprising a plurality of batteries bound together between two end plates having first and second threaded mounting studs affixed thereto and projecting outwardly from opposite ends of said pack, said supporting comprising:

a substantially horizontal tray including an upstanding peripheral rim, a retainer flange projecting outwardly from said rim along one side of said tray, and an upstanding mounting plate on the side of said tray opposite said retainer flange, said mounting plate including an aperture for receiving said first stud for anchoring one of said end plates to said mounting plate;

a retainer bar having an aperture therein for receiving said second stud for anchoring the other of said end plates to said bar;

means for securing said retainer bar to said retainer flange such as to hold said pack tightly in said tray; and means for attaching said support securely to appropriate structural members of said vehicle.

2. A support for securing a plurality of battery packs in a vehicle each of said packs comprising a plurality of discrete batteries bound together between two end plates having first and second threaded mounting studs affixed thereto and projecting outwardly from opposite ends of said pack, said support comprising:

a substantially horizontal tray, said tray including an upstanding peripheral rim, a retainer flange projecting outwardly from said rim along one side of said tray, and an upstanding mounting plate on the side of said tray opposite said retainer flange, said mounting plate including a plurality of apertures for receiving the first of said studs from each of said packs and anchoring one end of each of said packs to said plate;

a retainer bar having a plurality of apertures therein for receiving the second of said studs from each of said packs and anchoring the other end of each of said packs to said bar;

means for securing said retainer bar to said retainer flange such as to hold said pack tightly in said tray; and means for attaching said support securely to appropriate structural members of said vehicle.

3. A support for securing a plurality of battery packs in a vehicle each of said packs comprising a plurality of discrete batteries bound together between two end plates having first and second threaded mounting studs affixed thereto and projecting outwardly from opposite ends of said pack, said support comprising:

a substantially horizontal tray, said tray including an upstanding peripheral rim, a retainer flange projecting outwardly from said rim along one side of said tray, and an upstanding mounting plate on the side of said tray opposite said retainer flange, said mounting plate including a plurality of substantially vertical slots for receiving the first of said studs from each of said packs and anchoring one end of each of said packs to said plate regardless of the height of said studs above said tray;

a retainer bar having a plurality of apertures therein for receiving the second of said studs from each of said packs and anchoring the other end of each of said packs to said bar;

adjustable means for securing said retainer bar to said retainer flange such as to hold said pack tightly in said tray regardless of the height of said second studs above said retainer flange; and means for attaching said support to appropriate structural members of said vehicle.

4. A support for securing a plurality of battery packs in a vehicle each of said packs comprising a plurality of discrete batteries bound together between two end plates having first and second threaded mounting studs affixed thereto and projecting outwardly from opposite ends of said pack, said support comprising:

a substantially horizontal tray adapted to receive and maintain the bottoms of said packs in space relation one to the other, said tray including an upstanding peripheral rim, support flanges projecting outwardly from said rim at opposite ends of said tray for supporting said tray on appropriate structural members of said vehicle, a retainer flange projecting outwardly from said rim along one side of said tray intermediate said support flanges, and an upstanding mounting plate on the side of said tray opposite said retainer flange, said mounting plate including a plurality of substantially vertical slots for receiving the first of said studs from each of said packs and anchoring one end of each of said packs to said plate regardless of the height of said studs above said tray;

a retainer bar having a plurality of apertures therein for receiving the second of said studs from each of said packs and anchoring the other end of each of said packs to said bar; and threaded means for securing said retainer bar to said retainer flange such as to hold said pack tightly in said tray regardless of the height of said second studs above said retainer flange.

* * * * *

UNITED STATES PATENT AND TRADEMARK OFFICE
CERTIFICATE OF CORRECTION

PATENT NO. : 4,317,497
DATED : March 2, 1982
INVENTOR(S) : Robert D. Alt; James H. Richardson; Alverson B. Williams It is certified that error appears in the above—identified patent and that said Letters Patent is hereby corrected as shown below:

Column 2, lines 62 and 63, "supporting" should read -- support --.

Signed and Sealed this

Third Day of August 1982

[SEAL]

Attest:

GERALD J. MOSSINGHOFF

Attesting Officer     Commissioner of Patents and Trademarks